(12) United States Patent
Marcus

(10) Patent No.: US 6,275,298 B1
(45) Date of Patent: *Aug. 14, 2001

(54) METHOD FOR MEASURING A PHYSICAL DISTANCE IN A CAMERA BETWEEN TWO REFERENCE SURFACES

(75) Inventor: Michael A. Marcus, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/309,997

(22) Filed: May 11, 1999

Related U.S. Application Data

(60) Provisional application No. 60/122,523, filed on Mar. 3, 1999, provisional application No. 60/122,524, filed on Mar. 3, 1999, and provisional application No. 60/122,525, filed on Mar. 3, 1999.

(51) Int. Cl.$^7$ .............................. G01B 11/02; G01B 9/02
(52) U.S. Cl. ........................................ 356/497; 356/450
(58) Field of Search .................................. 356/357, 450, 356/496–498

(56) References Cited

U.S. PATENT DOCUMENTS

| | | |
|---|---|---|
| 5,757,485 | 5/1998 | Marcus et al. . |
| 5,757,486 | 5/1998 | Marcus et al. . |
| 6,075,601 * | 6/2000 | Marcus et al. ........................ 356/357 |

\* cited by examiner

*Primary Examiner*—Frank G. Font
*Assistant Examiner*—Phil Natividad
(74) *Attorney, Agent, or Firm*—Susan L. Parulski

(57) ABSTRACT

A method for measuring a physical distance in a camera between a first reference surface on the camera and a second reference surface on the camera wherein the first reference surface is substantially parallel to the second reference surface. An optical probe assembly is used in the method and includes a housing removably lockable to the camera in a predetermined orientation relative to the first reference surface. The method includes the steps of determining a distance LP from the first reference surface to an optically transparent material disposed intermediate the first and second reference surfaces. An optical probe assembly is removably mounted to the camera, and an optically flat plate is mounted at the second reference surface. Non-coherent light interferometry is used to determine a distance PF between the optically transparent material and the second reference surface. The distances of LP and PF are used to determine a distance between the first reference surface and the second reference surface.

4 Claims, 16 Drawing Sheets

METHOD FOR MEASURING A PHYSICAL DISTANCE IN A CAMERA BETWEEN TWO REFERENCE SURFACES

CROSS-REFERENCE TO RELATED APPLICATIONS

This application is related to commonly assigned U.S. Provisional 60/122,523 filed Mar. 3, 1999, Provisional Ser. No. 60/122,524 titled OPTICAL PROBE CALIBRATION APPARATUS by Marcus et al, and filed on Mar. 3, 1999, and to U.S. Provisional Ser. No. 60/122,525 titled OPTICAL PROBE FOR USE WITH A DIGITAL CAMERA FOR MEASURING FOCAL DEPTH by Marcus et al, and filed on Mar. 3, 1999.

FIELD OF THE INVENTION

The present invention relates generally to an optical probe assembly, particularly an optical probe assembly for use in determining a physical distance in a camera between two reference surfaces.

BACKGROUND OF THE INVENTION

To capture an image of an object using a camera, an image beam is directed through a lens and onto an image forming medium disposed at an image plane. In conventional photography, photographic film is disposed at the image plane and the image of the object is captured on photographic film. In electronic photography, an imager or image sensor (e.g., a Charge Coupled Device (CCD)), is disposed at the image plane, and the image of the object is captured electronically. For both conventional and electronic photography, it is necessary to properly position the image plane and the lens relative to each other within the camera to provide a focused image.

To properly position the image plane, the position of the image plane needs to be determined. Such a position can be determined relative to a reference surface or reference plane on the camera.

U.S. Pat. Nos. 5,757,485 (Marcus et al) and 5,757,486 (Marcus et al), commonly assigned and incorporated herein by reference, relate to a digital camera image sensor positioning apparatus and method which includes a non-coherent light interferometer. The apparatus and method include an optical probe assembly removably mountable to a digital camera. The non-coherent light interferometer is in communication with the optical probe assembly to determine a depth from a reference surface to the image surface and optical probe assembly. The apparatus and method have been suitable for their intended purpose, however, a need continues to exist for a method for determining (e.g., measuring) a physical distance in a camera between two reference surfaces. Such a method should be robust, comprise simple assembly, be readily constructed and aligned, and usable in a manufacturing environment, particularly by novice users. In particular, for SLR cameras configured for use with 35 mm photographic film or APS format film, a need continues to exist for rapidly measuring a distance between a lens mounting member of the camera and film rails disposed at the image plane. Such a measurement assists in the determination of whether the SLR camera is within manufacturing specifications.

SUMMARY OF THE INVENTION

An object of the present invention is to provide a method for determining a physical distance in a camera between two reference surfaces.

Another object of the invention is to provide such a robust method which is transportabe, simple to use, and can be readily used with both an electronic camera and a conventional photographic camera.

These objects are given only by way of illustrative example. Thus, other desirable objectives and advantages inherently achieved by the disclosed invention may occur or become apparent to those skilled in the art. The invention is defined by the appended claims.

According to one aspect of the present invention, there is provided a method for measuring a physical distance in a camera between a first reference surface on the camera and a second reference surface on the camera wherein the first reference surface is substantially parallel to the second reference surface. An optical probe assembly is used in the method and includes a housing removably lockable to the camera in a predetermined orientation relative to the first reference surface. The method includes the steps of determining a distance LP from the first reference surface to an optically transparent material disposed intermediate the first and second reference surfaces. An optical probe assembly is removably mounted to the camera, and an optically flat plate is mounted at the second reference surface. Non-coherent light interferometry is used to determine a distance PF between the optically transparent material and the second reference surface. The distances of LP and PF are used to determine a distance between the first reference surface and the second reference surface.

The present invention provides a method for determining a physical distance in a camera between two reference surfaces. The method is robust, transportabe, simple to use, and can be readily used with both a digital camera any a photographic camera.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
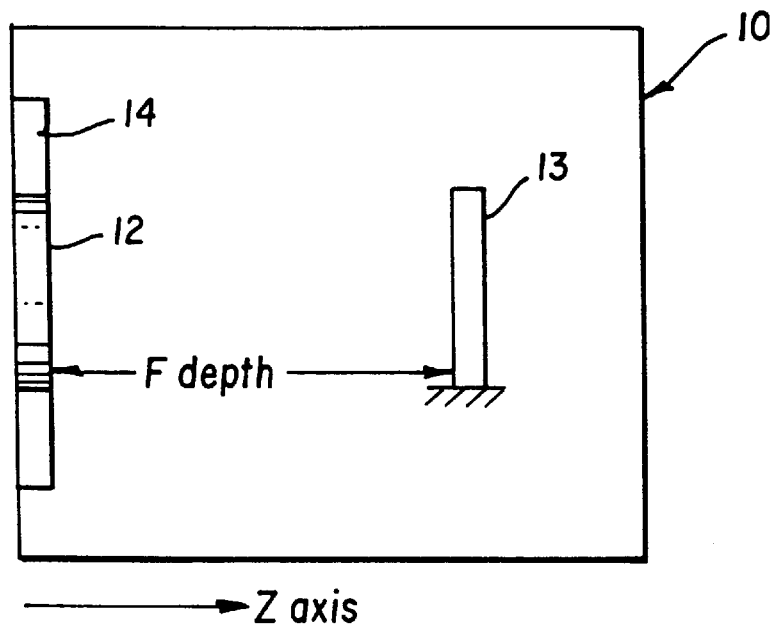
FIG. 1 shows a lens mounted within a camera body.

The following is a detailed description of the preferred embodiments of the invention, reference being made to the drawings in which the same reference numerals identify the same elements of structure in each of the several figures.

Referring to FIG. 1, a lens 12 is mounted to a camera body 10 by means of a camera lens mount 14. The distance at which lens 12 focuses light in the camera body is referred to as the focal depth $F_{depth}$ of the lens in air, measured along the z-axis. The focal depth $F_{depth}$ can be determined by means known to those skilled in the art. In a conventional camera employing photographic film 13 as the image media, the film is positioned at the focal depth $F_{depth}$ of the lens. FIG. 1 illustrates film 13 positioned at the focal depth of the lens, to provide a focused image. Known means (not shown) such as film rails, may be employed to position film 13 at the focal depth $F_{depth}$. Hereinafter, the terminology "in-focus position" refers to a position at which an imaging media is positioned to provide an in-focus image.

Figure 2:
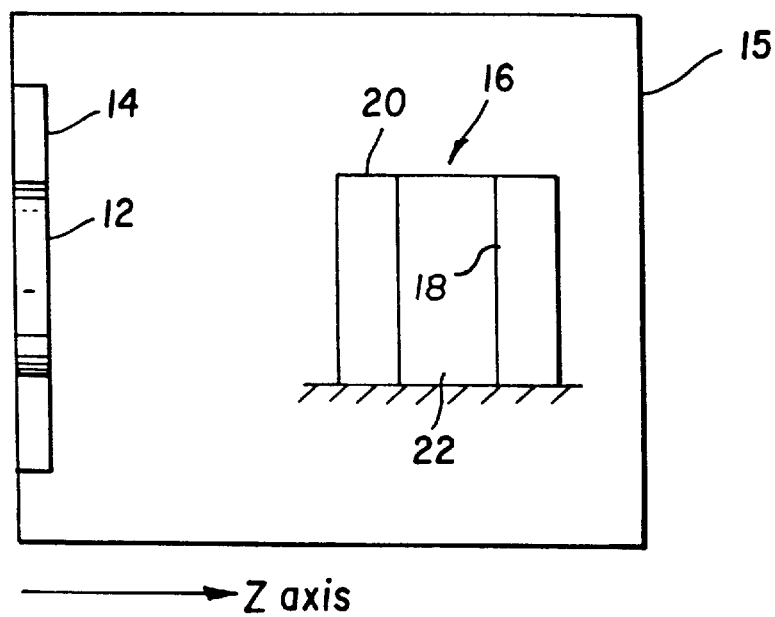
FIG. 2 shows a CCD mounted within a camera body.

Referring to FIG. 2, in a digital camera body 15, lens 12 is typically mounted to the digital camera by means of camera lens mount 14. An image sensor 16 is employed as the imaging media. Image sensor 16 comprises an imager plane 18 referring to an active surface of the image sensor. Image sensor 16 generally further comprises an optically transparent plate 20 (hereinafter referred to as imager cover plate 20) having an index of refraction n. Imager plane 18 is spaced from imager cover plate 20 such that a gap or interstice 22 is interposed intermediate the imager plane and the plate. Typically, the imager plane and the transparent plate are hermetically sealed with a defined interstice 22.

As indicated above with regard to a conventional camera, the distance at which lens 12 focuses light is referred to as the focal depth $F_{depth}$ of the lens. However, in a digital camera, the presence of imager cover plate 20 (disposed intermediate the lens and the image sensor) affects the in-focus position. Accordingly, an in-focus position $F_I$ for imager plane 18, taking into account the presence of imager cover plate 20, is determined by:

$$F_I = F_{depth} + \text{Delta} \quad \text{(Equation 1)}$$

wherein $$\text{Delta} = t(1 - 1/n) \quad \text{(Equation 2)}$$

with t being the thickness of imager cover plate 20 and n being the index of refraction of imager cover plate 20.

Figure 3:
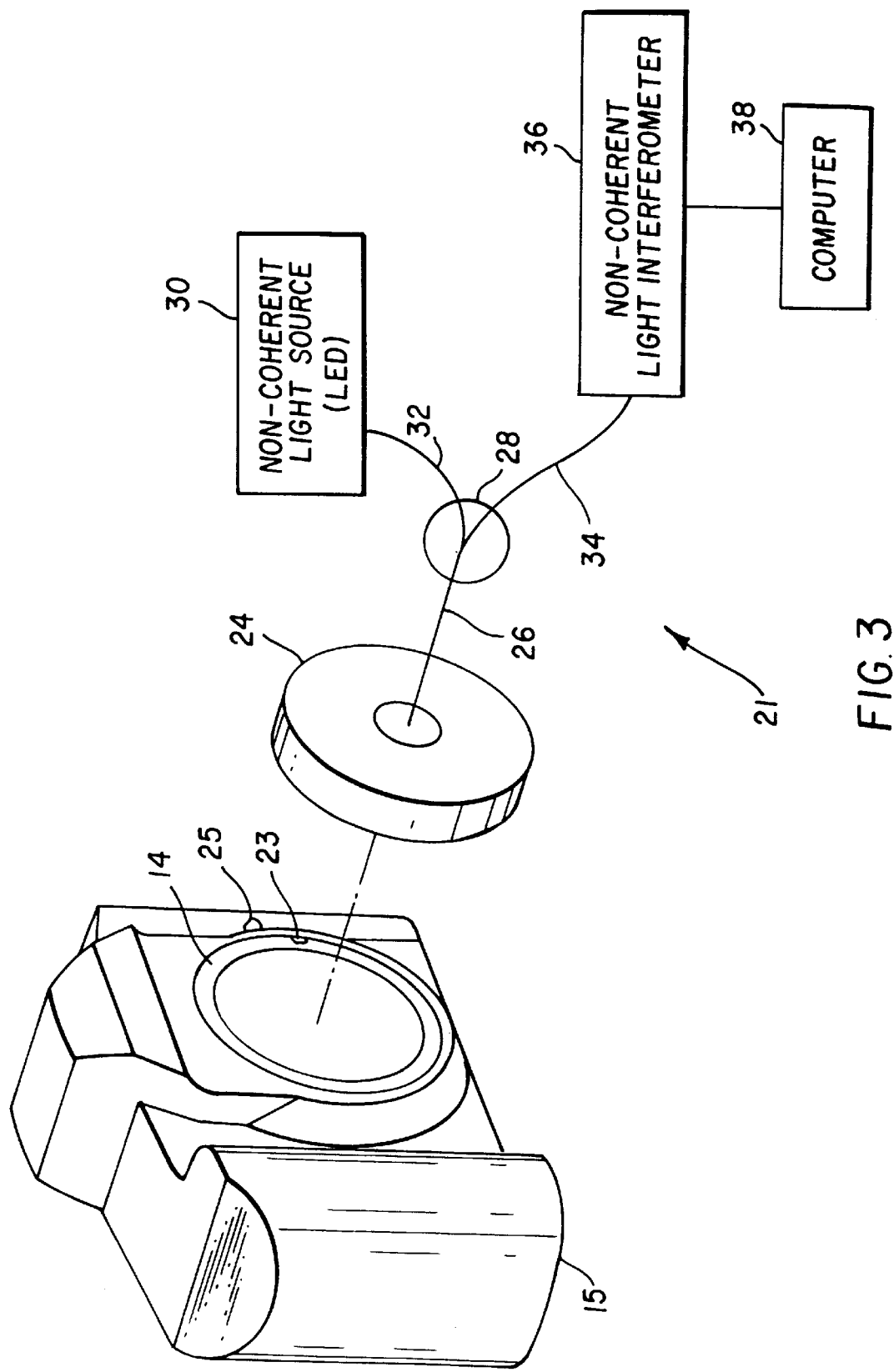
FIG. 3 shows a non-coherent light interferometric measurement apparatus according to the present invention.

FIG. 3 provides a general illustration of a non-coherent light interferometric measurement apparatus 21 according to the present invention for determining the position of image sensor 16 relative to a reference surface on the digital camera. The apparatus allows a user to verify that the position of imager plane 18 is within a desired tolerance. If the position of imager plane 18 is outside the desired tolerance, the image sensor can be re-positioned to move imager plane 18 to a desired position, such as the in-focus position $F_I$.

Lens 12 is generally mounted to digital camera body 15 by lens mount 14. Conventional means (not shown) are known to facilitate mounting of the lens to the camera body. Such means may include: a screw lens mount wherein screw threads allows installation of the lens to the camera body; a bayonet lens mount wherein the lens is placed in keyed-contact and rotated over a mating flange on the camera body with a twist of about 45 degrees; or a breechlock lens mount wherein a knurled collar on the back of the lens fits over a mating flange on the camera body. To secure the mounting, the lens mount may include a locking means to lock the lens to the lens mount. Similarly, to unlock the lens from the lens mount, an unlocking means may be included.

In the present invention, to determine the position of imager plane 18, lens 12 is removed from digital camera body 15. Since lens 12 is removed, the position of imager plane 18 is determined relative to a reference surface on digital camera body 15. While various surfaces (including, but not limited to, components of the digital camera body) may be used as a reference surface, for ease of discussion, camera lens mount 14 will provide the reference surface. Therefore, the position of imager plane 18 will be discussed as being determined relative to camera lens mount 14.

Referring to FIG. 3, an optical probe assembly 24 is removably mounted to camera lens mount 14 to securely, but temporarily, attach optical probe assembly 24 to digital camera body 15. Preferably, optical probe assembly 24 incorporates the means to allow the assembly to be mounted to digital camera body 15 by means of the bayonet lens mount wherein the assembly would slip over a mating flange on the camera body with a twist of about 45 degrees. To temporarily secure the mounting, a locking means 23, for example a spring loaded locking pin, locks optical probe assembly 24 to camera lens mount 14. To unlock optical probe assembly 24 from camera lens mount 14, an unlocking means 25 such as a spring loaded release pin, is employed thereby allowing optical probe assembly 24 to be readily released from digital camera body 15. Note that such locking means 23 and unlocking means 25 may optionally be employed to lock and unlock, respectively, lens 12 to camera lens mount 14.

Optical probe assembly 24 includes is coupled to a 1×2 optical coupler 28 by a single mode optical fiber cable 26. Preferably, connectors and patchcords (not shown) of variable length (preferably patchcords which terminate with a low back reflection connector such an FC connector) are disposed between optical coupler 28 and optical probe assembly 24 to permit portability for the apparatus and to permit remote location mounting. A non-coherent light source 30, such as an LED (Light Emitting Diode), is coupled into a single mode fiber 32 and passes through 1×2 optical coupler 28. A suitable non-coherent light source 30 is a high bandwidth (approximately 40–120 nm) 1300 nm center wavelength LED having 5–100 microwatts of coupled power.

Generally, light from non-coherent light source 30 travels along optical fiber cable 26, transmitted through optical probe assembly 24, and is incident on image sensor 16. The light is reflected from each of the surfaces of image sensor 16, and passes back through optical probe assembly 24 into optical fiber cable 26. The reflected light then passes through 1×2 optical coupler 28 into an optical fiber 34, which is introduced into a non-coherent light interferometer 36. Preferably, interferometer 36 is of a Michelson configuration, though a non-Michelson configuration has been found suitable. Associated with non-coherent light interferometer 36 is a computing means 38, such a computer, for controlling, collecting, manipulating, analyzing, and storing data.

Figure 4A:
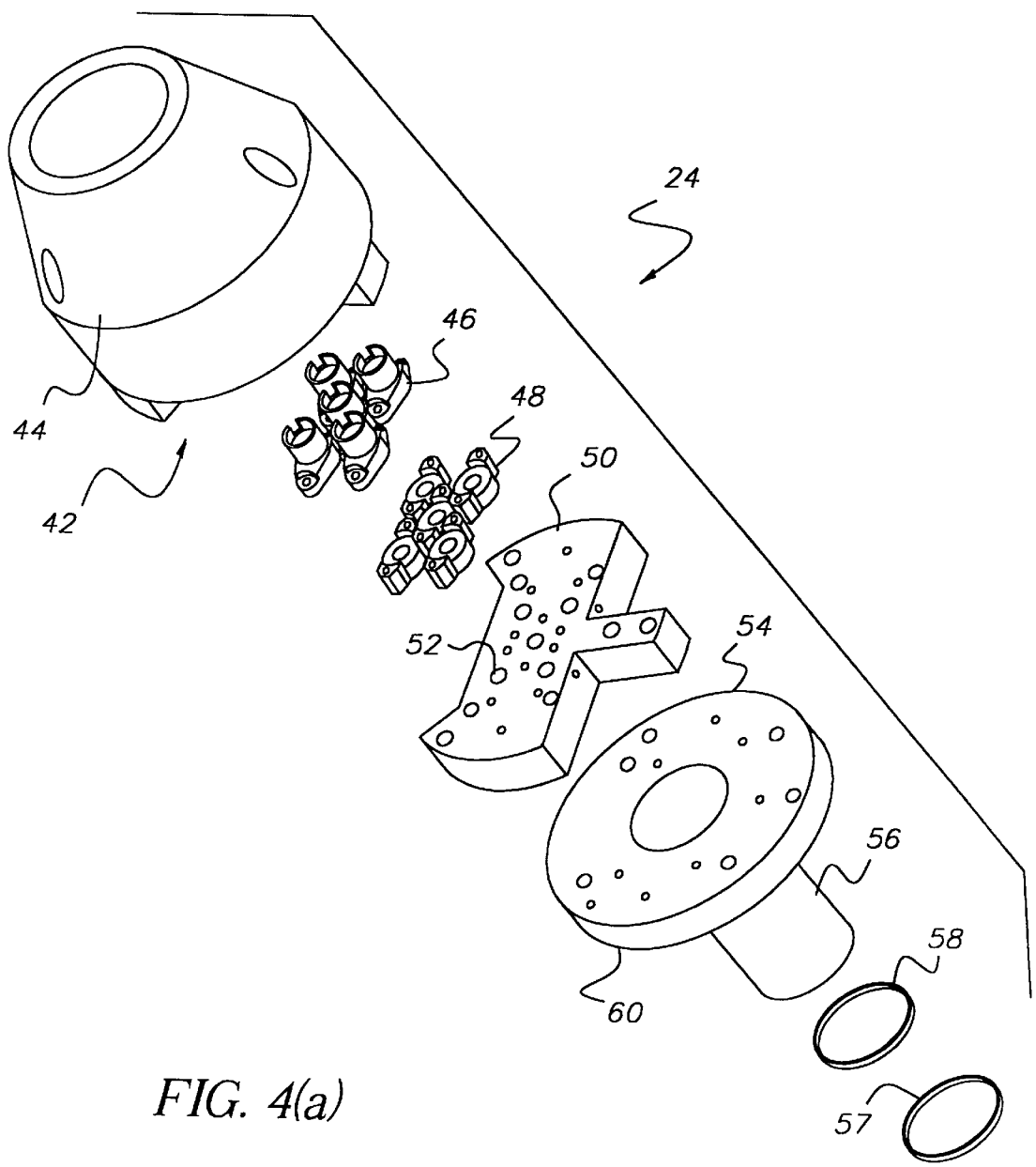
FIG. 4(a) shows an exploded view of a first embodiment of an optical probe assembly of FIG. 3 employing a pellicle.
Figure 4B:
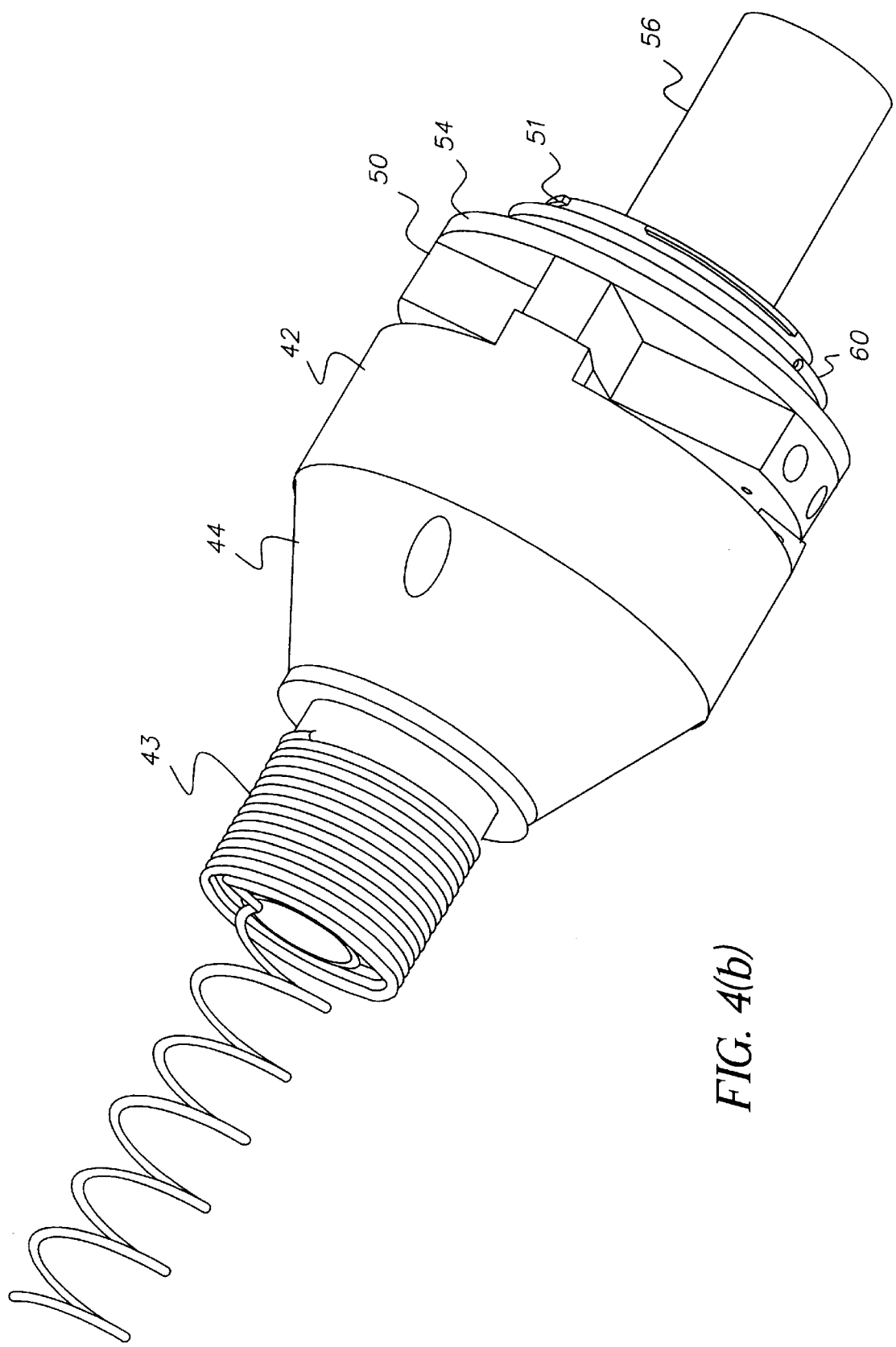
FIG. 4(b) shows a perspective view of the first embodiment of the optical probe assembly of FIG. 3.
Figure 4C:
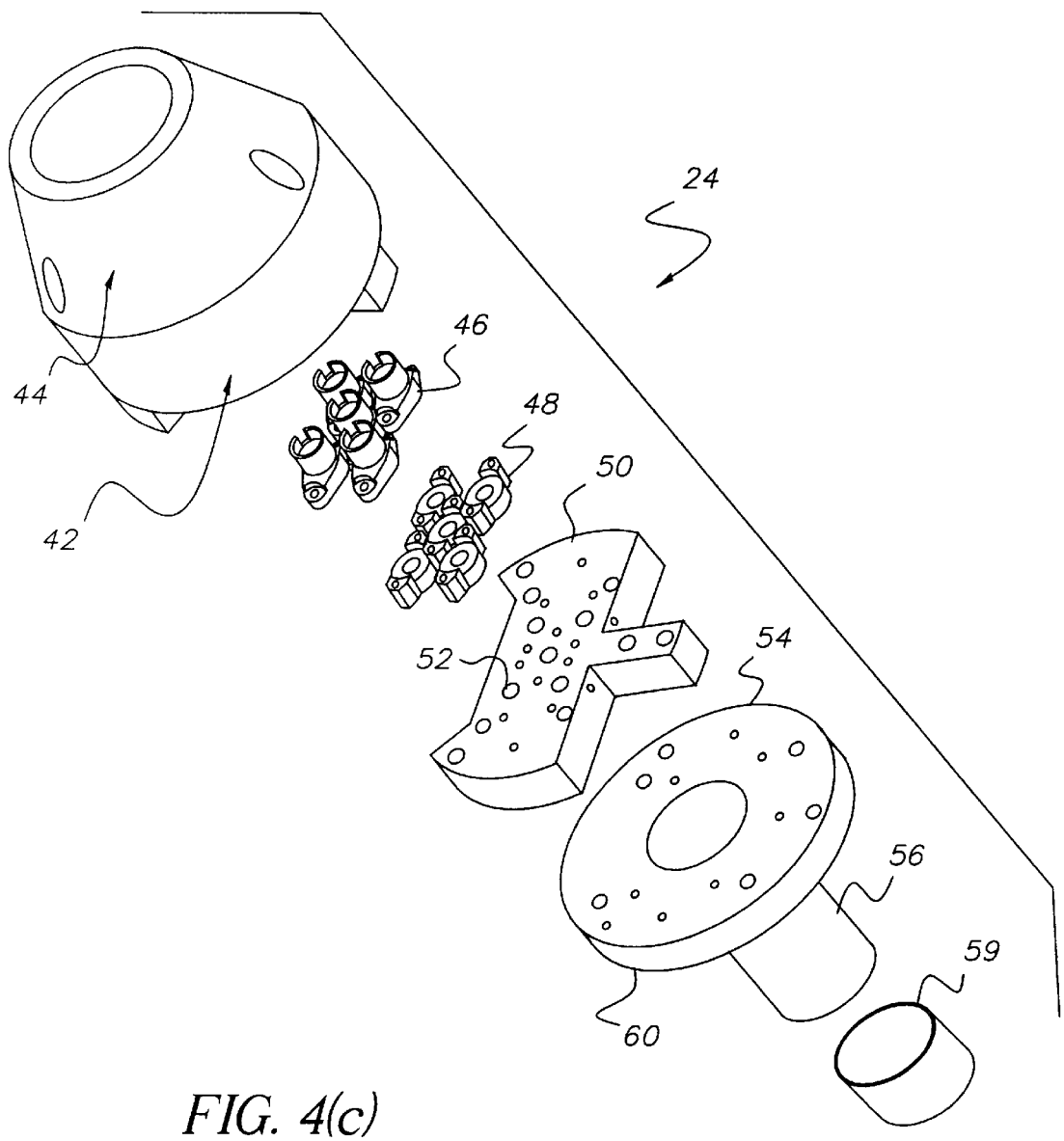
FIG. 4(c) shows an exploded view of the first embodiment of the optical probe assembly of FIG. 3 employing a transparent material, such as glass.

A first embodiment of optical probe assembly 24 (shown without an optical fiber) is illustrated in FIGS. 4(a) through 4(c). Optical probe assembly 24 comprises a probe housing 42 having a probe gripping portion 44, at least one fiber receptacle 46 for receiving an optical fiber (not shown), at least one angled plate 48 to position the optical fiber (not shown), a mounting plate 50 having a plurality of openings 52 which receive a lens (not shown), a probe insertion portion 54 having a pellicle mounting portion 56 in which a pellicle 58 is disposed at a predetermined distance $P_{depth}$ from a probe mounting surface 60. A plastic snap ring 57, for example an O-ring, secures pellicle 58. Probe insertion portion 54 also includes a probe mounting and locking member 51 adjacent probe mounting surface 60. An optional fiber strain relief 43 can be attached to probe housing 42.

Generally, to assemble optical probe assembly 24, a GRIN lens (Gradient Index lens) (not shown) is securely mounted in opening 52 in mounting plate 50. Angled plate 48 is placed in mechanical association with fiber receptacle 46 and then securely mounted to mounting plate 50. This subassembly in turn is securely mounted to probe insertion portion 54.

Figure 6:
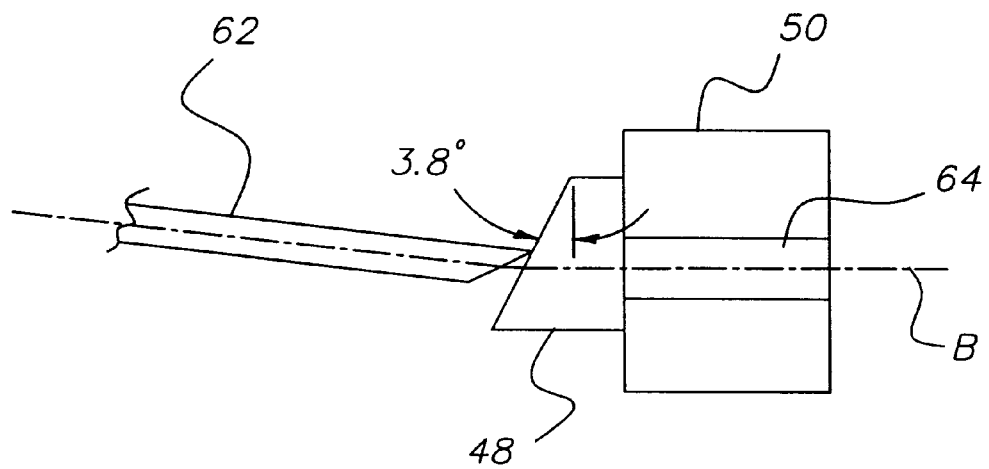
FIG. 6 shows a schematic view of the arrangement of the angled optical fiber within the optical probe assembly.
Figure 7A:
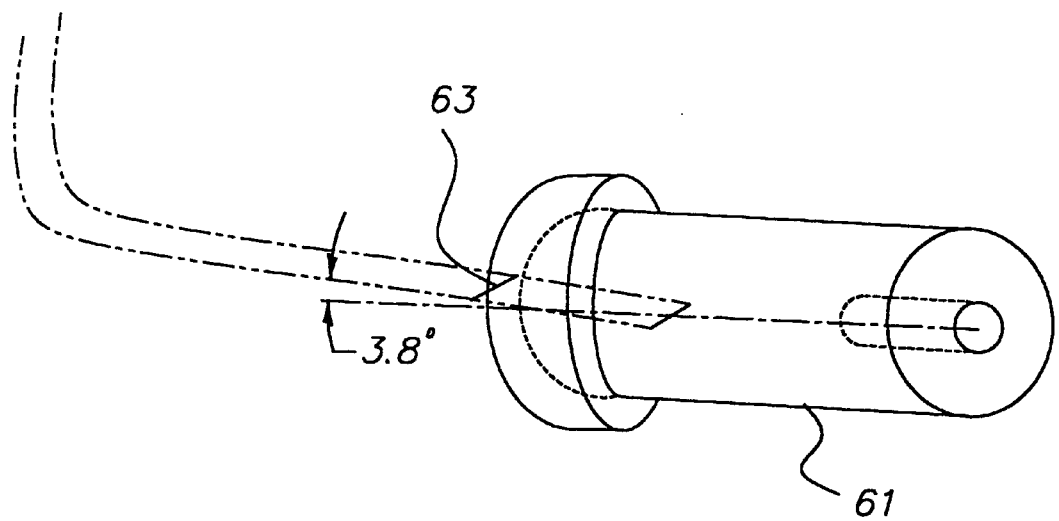
FIG. 7(a) shows a schematic view of a mounted angled optical fiber for use in a second embodiment of an optical probe assembly in accordance with the present invention.
Figure 7B:
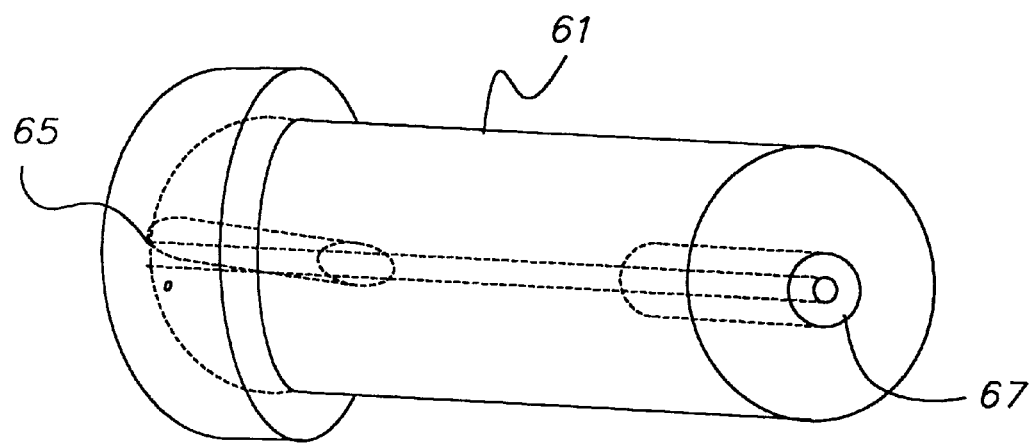
FIG. 7(b) shows a schematic view of a probe chuck for use with the second embodiment of the optical probe assembly.
Figure 7C:
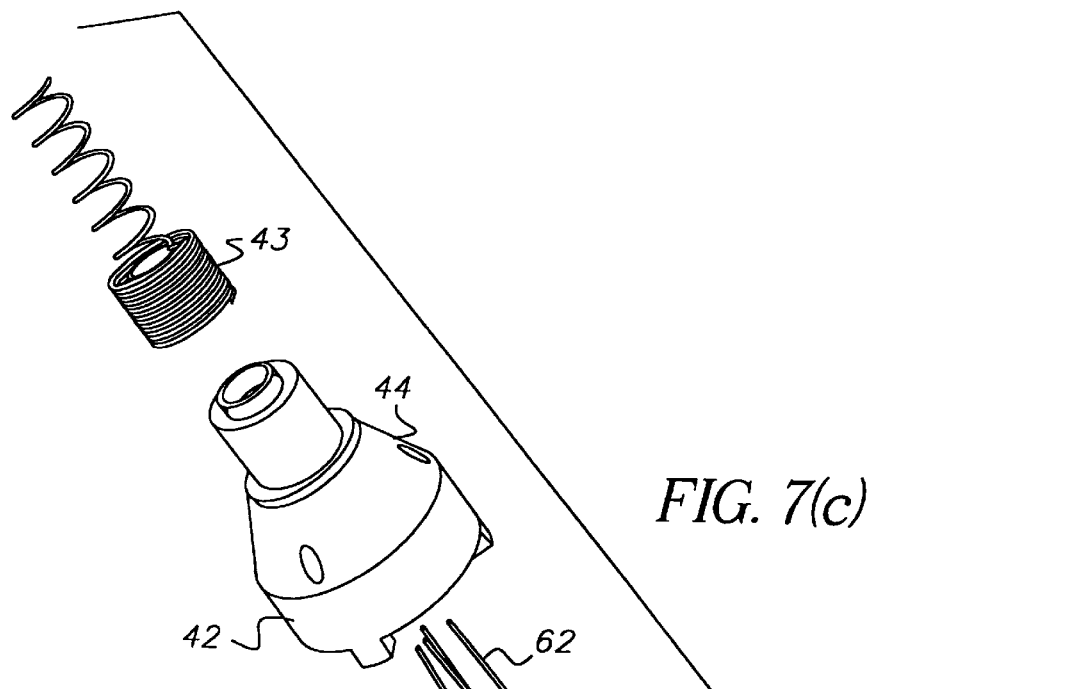
FIG. 7(c) shows an exploded perspective view of the second embodiment of the optical probe assembly.
Figure 7C:
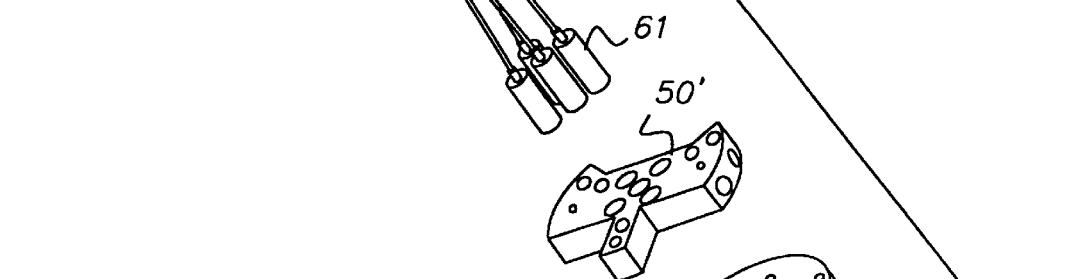
Figure 7D:
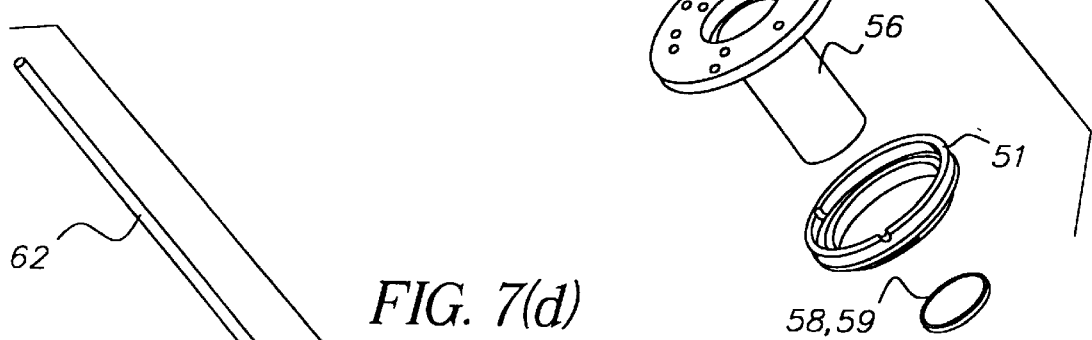
FIG. 7(d) shows an exploded perspective view of a portion of the second embodiment of the optical probe assembly.
Figure 7D:
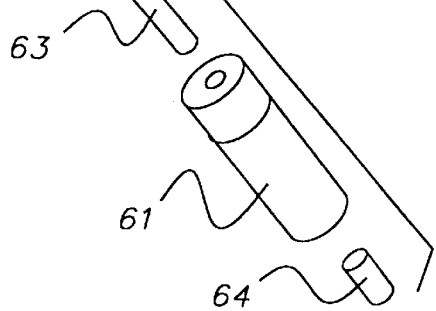
Figure 7E:
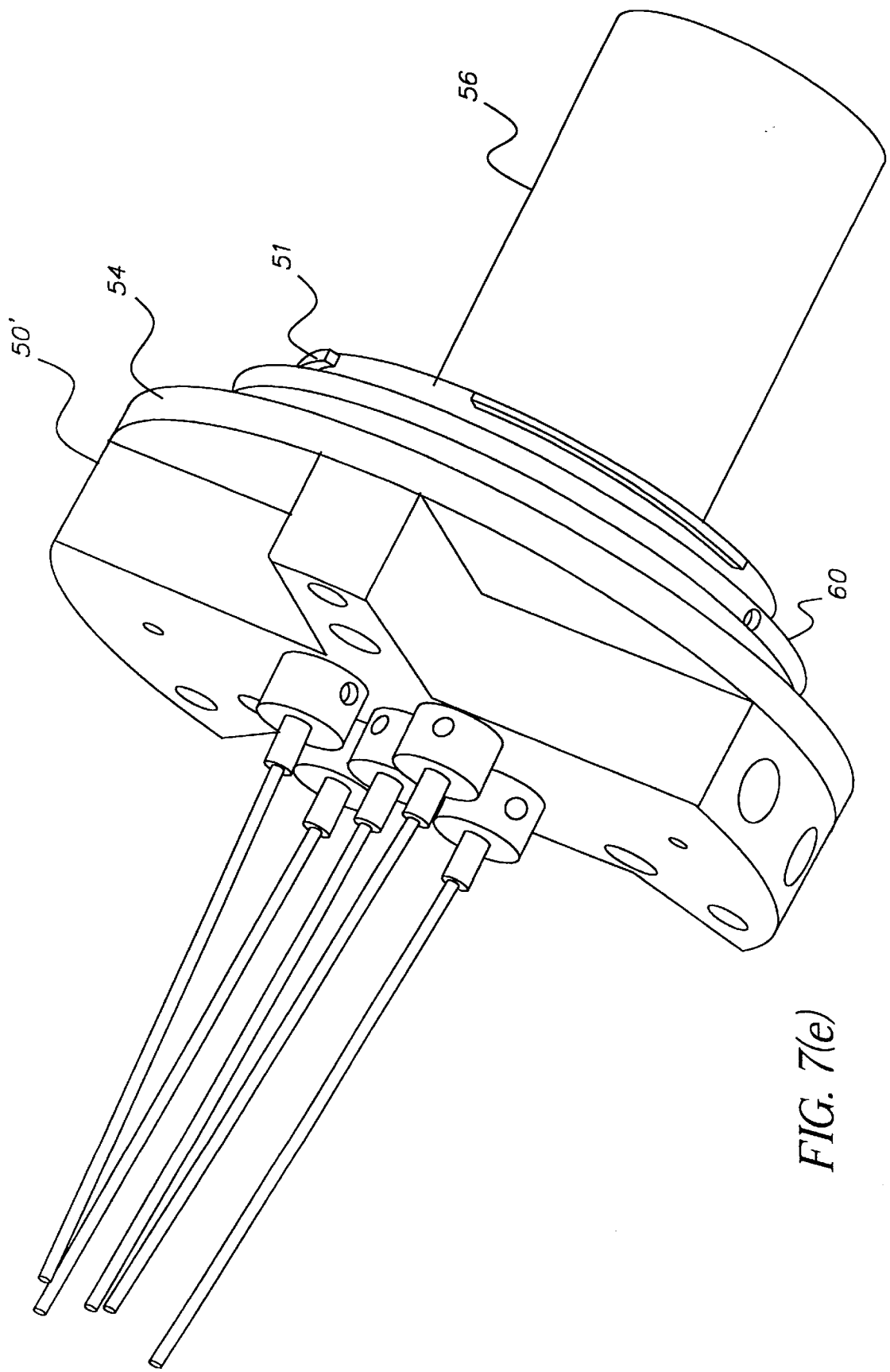
FIG. 7(e) shows a perspective view of a portion of the second embodiment of the optical probe assembly.
Figure 7F:
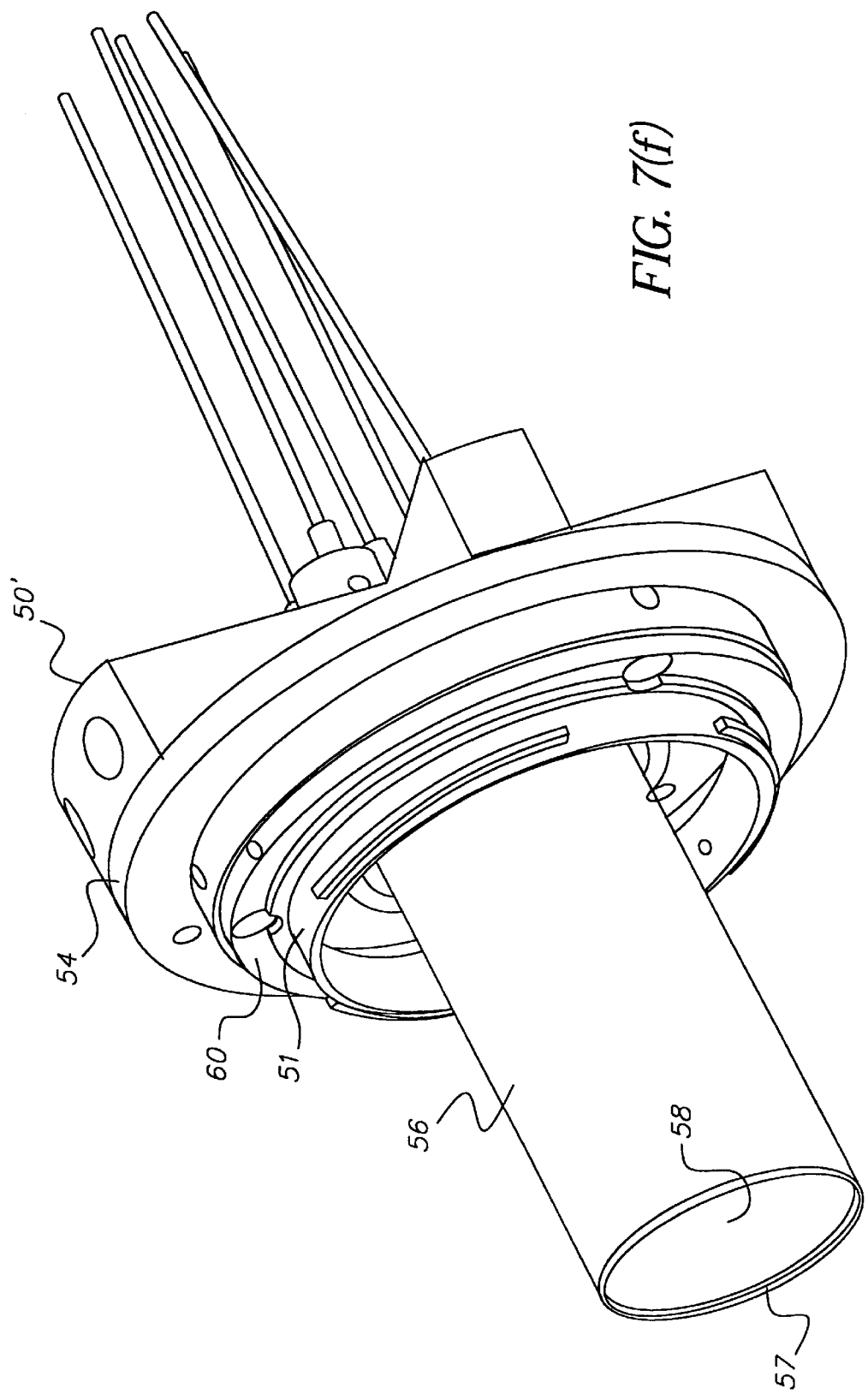
FIG. 7(f) shows a perspective view of a portion of the second embodiment of the optical probe assembly.

More particularly, to assembly optical probe assembly 24, angled plate 48 is used to ensure that the optical axis of the angled fibers is normal to the optic axis of the probe. Fiber receptacle 46 is preferably a modified Rifocs DAK-13/FC receptacle used to couple to the APC/FC connectorized optical fiber. In a preferred embodiment, a Nippon Sheet Glass (NSG) 4 mm diameter GRIN lens (P/N W40-S1111-078 N/C) is inserted into each of the five 0.159 inch diameter holes in mounting plate 50 and locked in place with 2-56 set screws. The GRIN lens is arranged to focus the beam of light along an axis. As will become more apparent, the GRIN lens must have a depth of focus sufficient to measure the physical distance between probe mounting surface 60 and the object being positioned (e.g., the imager). The lens-to-optical fiber distance is 7.0 mm for a 55 mm focal length. These lenses have a length of about 4.2 mm, and an initial recess of the lens in mounting plate 50 is set for an appropriate focal length. A final local length adjustment is performed later if necessary. Angled plate 48 and modified DAK-13/FC fiber receptacles 46 are then inserted into each other so that the FC connector cutout is oriented toward the thicker part of the angled plate and oriented as shown in FIG. 6. The DAK-13/FC connector keys are oriented in the same direction so that the fiber connections to the probe head do not interfere with each other. Once oriented properly, the combined receptacles and angled plates are mounted to the mounting plate by means of ten 1-72 mounting screws. The assembled mounting plate is then inserted into probe insertion portion 54 so that the two pins and the five 1-72 threaded mounting screw holes are in proper alignment. The assembly is locked in place with five 1-72 screws, and probe mounting and locking member 51 is secured to probe insertion portion 54. To align the optical probe assembly and to obtain the correct focal length, the optical probes are tested. A single mode optical fiber cable terminated in a Diamond FC/APC receptacle is connected to each of the 5 modified fiber receptacles, and locked in place using the key. The other end of the fiber cable goes to the non-coherent light interferometer instrument for testing of that probe. The optical probe is installed on an optical bench so that the camera probe insertion portion is held firmly oriented along the optical axis of the probe insertion portion.

Once the optical fibers are aligned, the plurality of fibers are bundled together and placed in a common tube for protection. Fiber strain relief 43 is used to protect the fibers at the point of attachment to the optical probe assembly and to keep the fibers straight at the connection points to the optical probe assembly.

Figure 5:
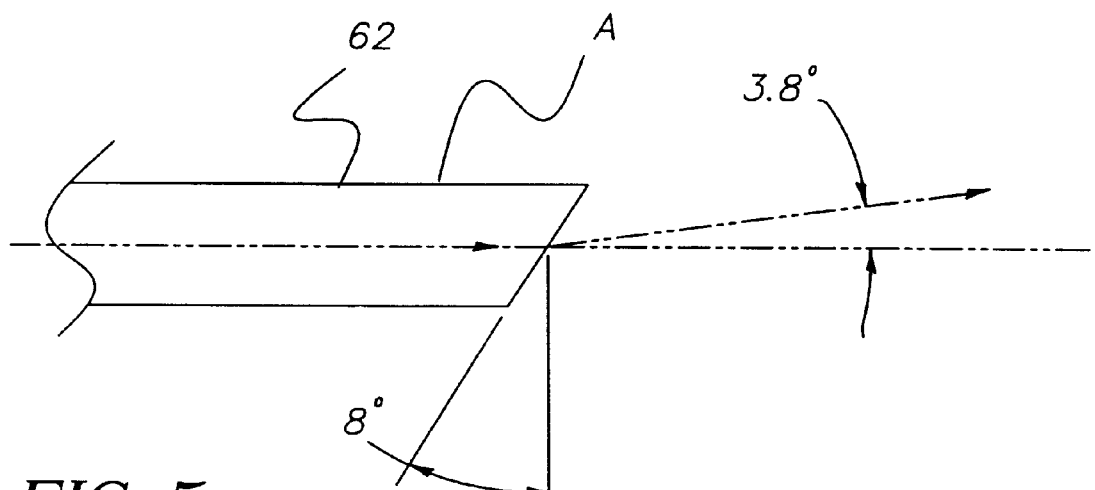
FIG. 5 shows a schematic view of an angled optical fiber.

FIGS. 5 and 6 provide further illustration of the mounting of an angled optical fiber 62 within optical probe assembly 24. (When angled optical fiber 26 is connectorized, it is generally denoted as optical fiber cable 26.) As indicated above, a GRIN lens 64 has been found suitable for use with the present invention. The focal length of the lens is dependent on the lens to optical fiber spacing. Angled optical fiber 62 is arranged to emit a beam of light along its axis A. As illustrated in FIG. 5, optical fiber 62 used by Applicants is comprised of a fiber core has a 9 $\mu$m diameter and exits the fiber at an approximate 3.8 degree angle with respect to the incoming normal. GRIN lens 64 is disposed in the path of the beam of light so as to direct the beam of light along an axis B normal to the plane of the lens. As will become apparent, the beam of light along axis B is directed toward the image sensor or object which is being positioned within the camera. Note that the light from the optical fiber must be centered on and parallel to the GRIN lens axis. Angled plate 48 (best illustrated in FIG. 6) is used to ensure that the light will be input parallel to GRIN lens axis B. A suitable optical fiber 62 is an angle cleaved and connectorized single-mode optical fiber. The angle cleave minimizes back reflections through the single-mode fiber. Applicants prefer a APC/FC connector comprised of a tungsten carbide steel which provides for reproducible fiber tip offset from the end of the fiber when positioned within a fiber receptacle. The tungsten steel connectors also promote reproducible focal length with an optical probe when changing the optical fiber cable attached to the optical probe. Rotation of the optical fiber coupling 3.8 degrees clockwise, the output light exits normal to the plane of the GRIN lens if the incoming light emanates along the optical axis of the lens. Note that the APC/FC connector is keyed so that angled plate 48 is angled at an appropriate direction to direct the light to exit normal to the axis of the GRIN lens.

Pellicle 58 is comprised of an optically transparent material which is sufficiently thin so as to not affect the focal depth measurement. A suitable pellicle can be made of a polyester film material of a thickness of approximately 1–3 $\mu$m, preferably 1.5 $\mu$m. Means are provided for securely mounting the pellicle to optical probe assembly 24. For example, a plastic snap ring held in a groove provides secure mounting to a pellicle mount. Alternatively, the pellicle can be set in place with a suitable adhesive. For Applicants particular application, a thin groove (not shown) is turned on an inner surface at one end of pellicle mounting portion 56. The groove is turned such that the pellicle will be perpendicular to the axis of the optical probe assembly. The pellicle is preferably lightly stretched to fit within this thin groove, and is secured using a plastic snap ring 57. During installation of the pellicle, pellicle mounting portion 56 is placed in a fixture such that the grooved end is in a horizontal plane and facing upward. The pellicle is stretched across the end of the pellicle mounting portion, and plastic snap ring 57 is inserted into the groove and snapped in place. Heat, as such from a heat gun, may be used to even the tension in the pellicle.

As illustrated in FIG. 4(*c*), for the present invention, pellicle 58 can be replaced with an optically transparent material, for example a glass plate 59 of approximately 4–7 mm in thickness, so long as the optical path through the glass plate (nt) is larger than the maximum scan distance scanned with the interferometer. The pellicle (or glass plate) is disposed intermediate the reference surface on the camera (described above as being the lens mount) and the image sensor or object being positioned within the camera. Note that while the pellicle is sufficiently thin to have only one reference surface, when glass plate 59 is used, it's second surface (i.e., the surface adjacent the imager) is used as the reference surface. Also note that when glass plate 59 is used, the effective focal length in air of the lens is increased. Therefore, a shorter focal length is used when glass plate 59 is utilized. For example, an approximate 2 mm focus shift may occur with a 6 mm thick glass plate having an index of refraction of approximately 1.5.

As with the pellicle, means are provided for securely mounting glass plate 59 to optical probe assembly 24. For Applicants particular application, a groove (not shown) as thick or slightly thicker than the glass plate is turned on an inner surface at one end of pellicle mounting portion 56. The groove is turned such that the glass plate will be perpendicular to the axis of the optical probe assembly. The diameter of the glass plate is arranged so as to fit tautly in the grooved surface. Once inserted into the groove, the glass plate is secured, for example, using an optimal optic cement (preferably uv curing).

Preferably, a plurality of optic fibers are employed. As illustrated in FIG. 4(*a*), angled plate 48 and fiber receptacle 46 are configured for five optic fibers. Five optical fibers are preferred so as to be able to determine the flatness of an image sensor mounted in a digital camera and to be able to determine whether an image sensor mounted in a digital camera is parallel relative to a reference surface on the digital camera. The five optical fibers define the five measurement locations. Typically, a center location, and four locations near the corners of the imager are used.

In some instances, where it is desired to measure points at different locations which are spaced closely together on an imager surface, the connectorized fibers arrangement may not be suitable. Therefore, in a second embodiment of optical probe assembly 24, illustrated in FIGS. 7(*a*)–7(*f*), fiber receptacle 46 and angled plate 48 are replaced by a probe chuck 61. Accordingly, the connectorized APC/FC fibers are replaced by bare APC/FC ferrules 63. Such a probe chuck arrangement provides for an exact constraint mounting to ensure that the optical axis of the optical fiber is normal to the optic axis of the optical probe assembly. Referring to FIGS. 7(*a*) and 7(*b*), in a preferred arrangement, a 0.25 inch diameter fiber chuck has, at one end, a 2 mm diameter through hole at a length of 20 mm. A 2.5 mm hole 65, angled at approximately 3.78 degrees from normal is tapped at the same end so as to receive the optical fiber ferrule 63. At the other end of fiber chuck 61 is disposed a 4 mm diameter hole by which to receive a 4 mm 4.12 mm long GRIN lens 64, best illustrated in FIG. 7(*d*). APC/FC ferrule 63 is used to mount the optical fiber in probe chuck 61. As with the first embodiment, in the second embodiment, angled optical fiber 62 is oriented in probe chuck 61 to emit a beam of light along an axis normal to the reference surface toward the object.

In the second embodiment, the mounting plate which holds probe chuck 61 is illustrated in FIGS. 7(*c*), 7(*e*), and 7(*f*) as mounting plate 50'. As illustrated in FIGS. 7(*a*)–7(*e*), probe chuck 61 is larger in diameter at one of its ends to facilitate mounting of probe chuck 61 in mounting plate 50'. As such, the second embodiment differs from the first embodiment in that the probe chuck 61 supports the optical fiber and GRIN lens 64. The dimension of probe chuck 61 having the larger diameter is cut to a length so as to place the GRIN lens at an appropriate focal length for the measurement.

This second embodiment can be used with both the pellicle and glass plate. To assemble the second embodiment, ferrule 63 is inserted into hole 65 and secured with an allen 2-56 screw. The ferrule is inserted into angled hole 65 such that its orientation duplicates that of FIG. 6. Once fully inserted, light emits parallel to the axis of probe chuck 61. A GRIN lens is inserted fully into a hole 67 (as shown in FIG. 6) and secured with an allen 2-56 screw. The length of probe chuck 61 is such that the fiber-to-lens spacing is set automatically for the appropriate focal length when ferrule 63 and the GRIN lens are each fully retained into their respective holes. Probe chuck 61 is then fully inserted into openings 52' of mounting plate 50'. When fully inserted, the entire structure is at the appropriate focal length. Once attachment is made to probe insertion portion 54, the remaining assembly is similar to that of the first embodiment.

Note that precision machining of probe chuck 61 promotes ready and easy alignment and assembly of the second embodiment.

For both the first and second embodiments, when optical probe assembly 24 is removably mounted to digital camera body 15, probe mounting surface 60 is at a predetermined orientation relative to a reference surface on digital camera body 15. As discussed above, for discussion purposes, the reference surface will be lens mount 14. Accordingly, in Applicants' arrangement, probe mounting surface 60 abuts camera lens mount 14 when probe mounting and locking member 51 is locked in place. Therefore, probe mounting surface 60 is at a predetermined distance from the reference surface on the digital camera body of 0.0 units.

Figure 8:
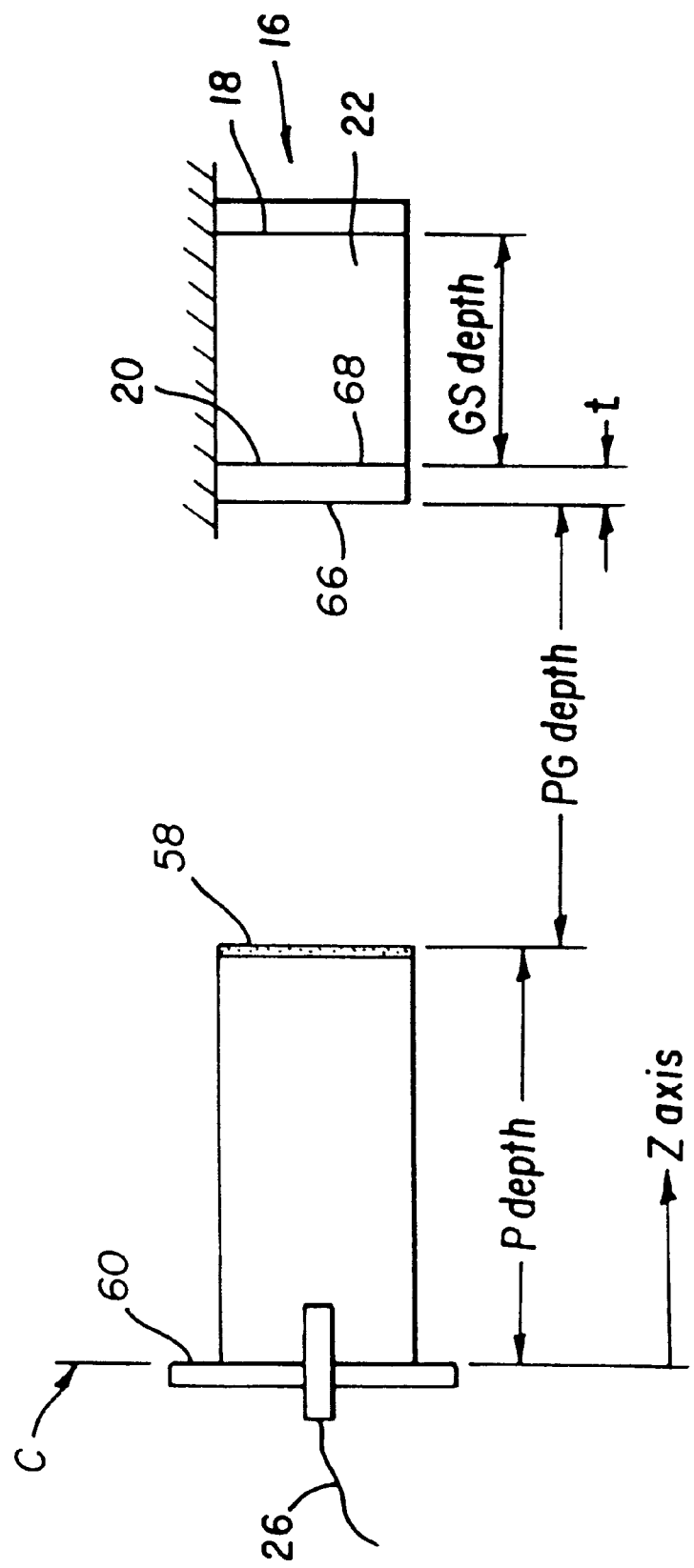
FIG. 8 shows a schematic view of the relationship of the optical probe assembly and the CCD when the optical probe assembly is mounted to the camera body.

With optical probe assembly 24 mounted to digital camera body 15, the orientation of optical fiber 62, GRIN lens 64, and image sensor 16 are as illustrated in FIG. 8. Pellicle 58 (or glass plate 59) is disposed at a predetermined depth $P_{depth}$ from probe mounting surface 60 and, accordingly, lens mount 14 (generally illustrated in FIG. 8 as the reference surface positioned at Reference Plane C). The physical distance from a front surface 66 to a back surface 68 of imager cover plate 20 is the thickness of the imager cover plate. The depth from pellicle 58 to front surface 66 of imager cover plate 20 is referred to as $PG_{depth}$, while the depth from back surface 68 of imager cover plate 20 to imager plane 18 is referred to as $GS_{depth}$. Accordingly, the actual depth $D_{actual}$ of imager plane 18 relative to the reference surface (i.e., lens mount 14 at Reference Plane C) is:

$$D_{actual} = P_{depth} + PG_{depth} + t + GS_{depth} \quad \text{(Equation 3)}$$

where t is the thickness of imager cover plate 20.

The corresponding total optical depth $D_{optical}$ from pellicle 58 (or glass plate 59) relative to the reference surface (i.e., lens mount 14 at Reference Plane C) is given by the equation:

$$D_{optical} = P_{depth} + PG_{depth} + nt + GS_{depth} \quad \text{(Equation 4)}$$

where n is the index of refraction of imager cover plate 20.

Substituting Equation 3 into Equation 4 results in:

$$D_{actual} = D_{optical} - nt + t = D_{optical} - t(n-1) \quad \text{(Equation 5)}$$

Accordingly, the difference between where imager plane 18 is actually positioned (i.e., $D_{actual}$) and the desired position, for example the in-focus position $F_I$ (from Equation 1), is referred to as the difference in focus $D_F$:

$$D_F = F_I - D_{actual} \quad \text{(Equation 6)}$$

With the optical probe assembly locked to the digital camera in a predetermined orientation whereby the pellicle (or the glass plate) is disposed at a known reference depth relative to the reference surface on the digital camera, non-coherent light interferometry can be utilized as disclosed in U.S. Pat. Nos. 5,757,485 (Marcus et al) and 5,757,486 (Marcus et al), commonly assigned and incorporated herein by reference, to determine (i) the depth from the reference surface to the front surface of the imager cover plate, (ii) the optical thickness of the imager cover plate, and (iii) the depth from the back surface of the imager cover plate to the image sensor. From this information, the position of imager plane 18 relative to the reference surface can be determined.

Note that for the present invention, a 55-mm focal length was selected for the design focal distance. Table I shows the required fiber to lens spacing, resulting focal diameter, focal depth and acceptance cone angle for a range of focal lengths around the value selected for the measurement geometry. Other focal lengths can be used, as shown in Table I, so long as the focal length is greater than the imager-to-lens mount spacing in the camera. The distance from the GRIN lens in the mounting fixture to the imager plane in the cameras determines the required focal length.

Also shown in Table I is the focal depth and acceptance angle for the lens as a function of focal length. It is observed that the acceptance angle is improved over a collimated design, which has an acceptance angle of less than 0.1 degree. This improved acceptance angle provides for the measurement of imagers with a large degree of tilt which will not focus properly when mounted into a camera body.

TABLE I

NSG 4.0 mm W40-S1111-078 N/C Lens Parameters

| Focal length (mm) | Lens to Fiber Spacing | Focal diameter (μm) | focal depth (mm) | Acceptance angle fwhm (degrees) |
|---|---|---|---|---|
| 50 | 6.952 | 55.702 | 3.749 | 0.709 |
| 51 | 6.927 | 56.963 | 3.921 | 0.693 |
| 52 | 6.902 | 58.223 | 4.096 | 0.678 |

TABLE I-continued

NSG 4.0 mm W40-S1111-078 N/C Lens Parameters

| Focal length (mm) | Lens to Fiber Spacing | Focal diameter (μm) | focal depth (mm) | Acceptance angle fwhm (degrees) |
|---|---|---|---|---|
| 53 | 6.879 | 59.483 | 4.275 | 0.664 |
| 54 | 6.856 | 60.743 | 4.458 | 0.650 |
| 55 | 6.835 | 62.003 | 4.645 | 0.637 |
| 56 | 6.814 | 63.264 | 4.836 | 0.624 |
| 57 | 6.794 | 64.524 | 5.031 | 0.612 |
| 58 | 6.775 | 65.784 | 5.229 | 0.600 |
| 59 | 6.757 | 67.044 | 5.431 | 0.589 |
| 60 | 6.739 | 68.304 | 5.637 | 0.578 |

Figure 9A:
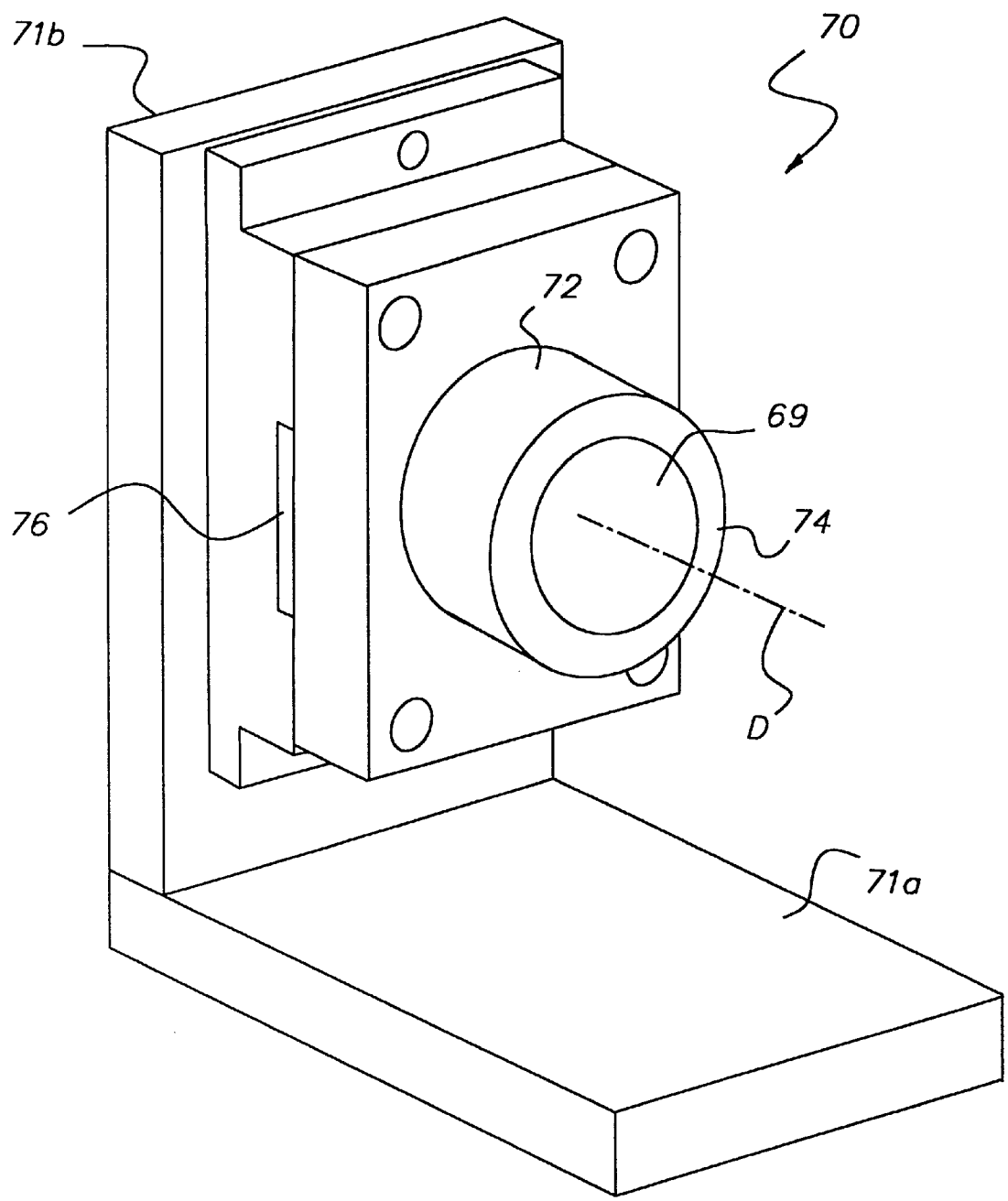
FIG. 9(a) shows a schematic view of an optical probe calibration apparatus in accordance with the present invention.
Figure 9B:
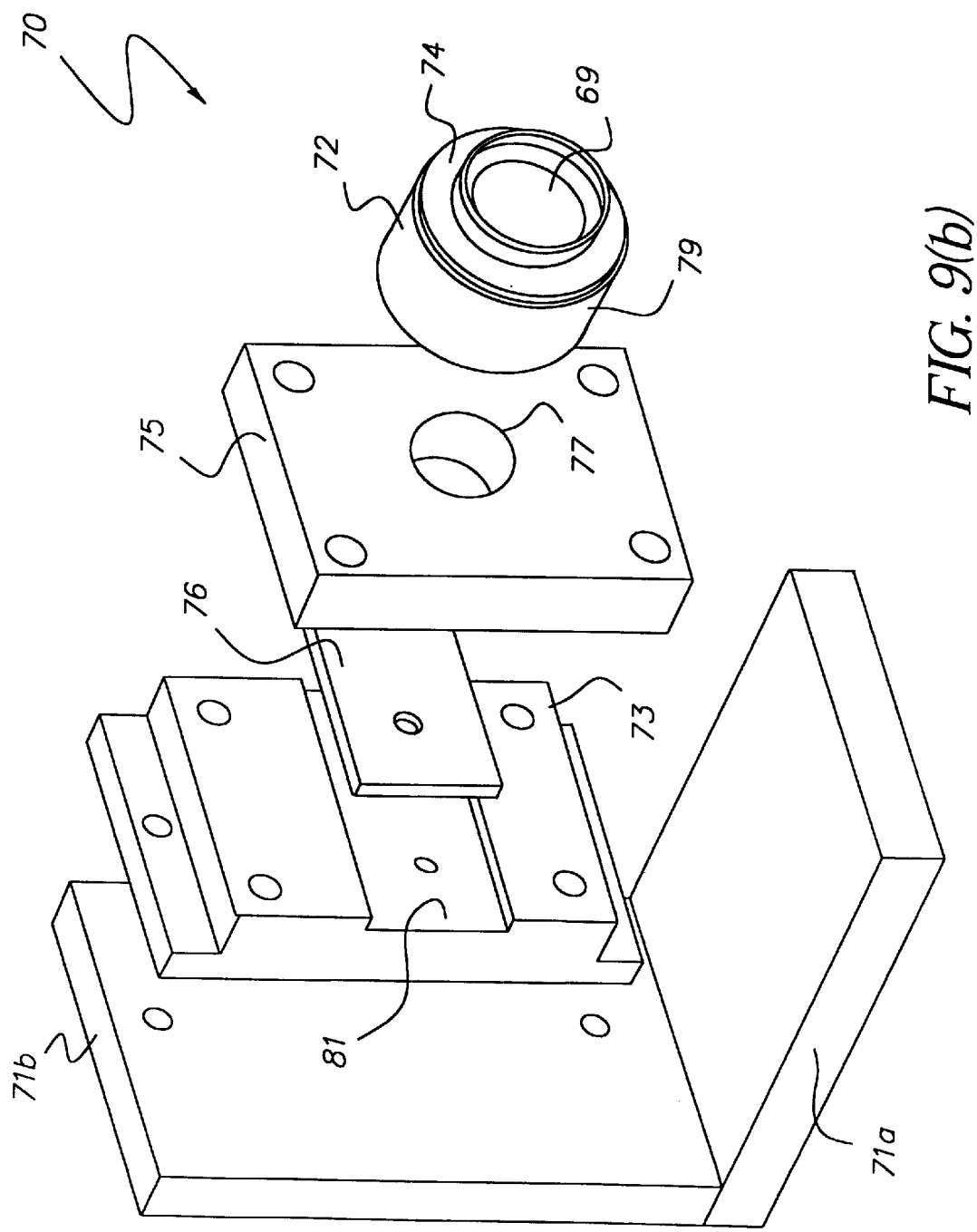
FIG. 9(b) shows an exploded perspective view of the optical probe calibration in accordance with the present invention.

An optical probe calibration apparatus 70 in accordance with the present invention is illustrated in FIGS. 9(a) and 9(b). Such an optical probe calibration apparatus is used to determine the absolute position of pellicle 58 or glass plate 59 in optical probe assembly 24. Optical probe apparatus 70 is also used to verify whether pellicle 58 or glass plate 59 is changing position as a function of temperature, pressure, humidity, or time. Further, optical probe calibration apparatus 70 may be used as a storage mounting member for when optical probe assembly 24 is not in use.

Calibration apparatus 70 includes a horizontal base 71a and a vertical base 71b. A calibration mount 72 includes an opening 69 having an axis D, and a calibration reference surface 74. Calibration mount 72 is mounted to vertical base 71b by means of a mounting plate 73 and a spacing member 75 having an opening 77 aligned with opening 69 of calibration mount 72. A recess 81 is disposed on mounting plate 73, and a target 76 is disposed within recess 81.

Optical probe assembly 24 is removably mountable to optical probe calibration apparatus 70 to securely, but temporarily, attach optical probe assembly 24 to calibration apparatus 70 by means of a locking and mounting portion 79 on calibration mount 72. Such a locking and mounting portion is preferably substantially similar to a lens mount, as previously described with reference to lens mount 14 of camera body 10 or digital camera body 15. Accordingly, a mounting arrangement between calibration mount 72 and optical probe assembly 24 is similar to that as described above with reference to the digital camera and the optical probe assembly.

Figure 10:
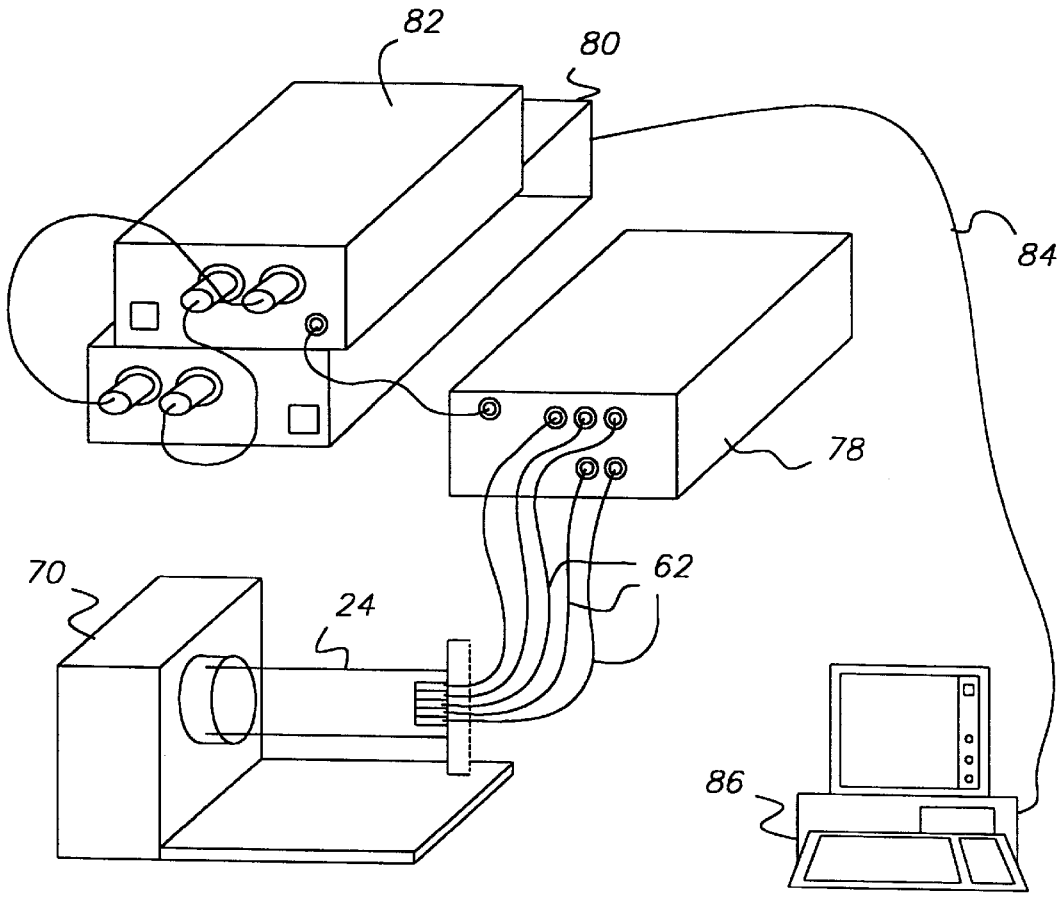
FIG. 10 shows a schematic view representing the relationship of the optical probe assembly and the optical probe calibration apparatus when the optical probe assembly is mounted to the optical probe calibration apparatus.

Illustrated in FIG. 10, optical probe assembly 24 is removably mountable to calibration apparatus 70. Optical fibers 62 (five are illustrated) are in electrical association with a multiplexer 78, transforming electronics 80, and a non-coherent light interferometer 82. Cabling 84 provides for connection to a computer 86.

As described above, when optical probe assembly 24 is removably mounted to camera body 10 or digital camera body 15, probe mounting surface 60 is at a predetermined orientation relative to a reference surface (i.e., camera lens mount 14) on digital camera body 15 when probe mounting and locking member 51 is locked in place. Similarly, when optical probe assembly 24 is removably mounted to optical probe calibration apparatus 70, probe mounting surface 60 (i.e., a reference surface) is at a predetermined orientation relative to calibration reference surface 74 on calibration mount 72. For ease of discussion, calibration reference surface 74 is comprised of a surface on calibration mount 72, however, a different reference surface on calibration apparatus 70 may be selected. Accordingly, in Applicants' preferred arrangement, probe mounting surface 60 abuts calibration mount reference surface 74. Therefore, for Applicants' particular arrangement, probe mounting surface 60 is at a predetermined distance of 0.0 units from calibration reference surface 74 on optical probe calibration apparatus 70.

Disposed at a predetermined distance along axis D from calibration reference surface 74 is calibration target 76. The calibration target is disposed substantially perpendicular to axis D so as to be parallel to calibration reference surface 74. For Applicants' particular arrangement, calibration target 76 is an optically flat plate, such as a polished stainless steel plate having a partially reflective surface.

Using a measurement apparatus, such as a Coordinate Measurement Machine (CMM), Applicants conducted ten measurements around the circumference of calibration mount 72 to define a plane of calibration reference surface 74. Then, the distance to calibration target 76 was measured for each of the five resulting measurement locations defined by the locations of i optical fibers as shown in FIG. 4(*a*) (wherein i is equal to 1 to n, wherein n is the total number of optical fibers within the optical probe assembly; for Applicants particular application, 5 optical fibers are illustrated in FIGS. 7(*c*) and 7(*d*)). This distance from calibration reference surface 74 to calibration target 76 is a predetermined distance.

Figure 11:
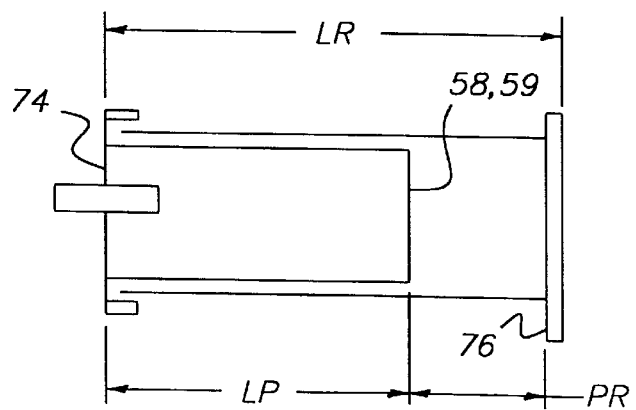
FIG. 11 shows a schematic view of a portion of the optical probe calibration apparatus.

Referring now to FIG. 10 and 11, the relative relationships of optical probe calibration apparatus 70 and optical probe assembly 24 are shown. A value of $LR_i$ is a distance from calibration reference surface 74 to calibration target 76. With optical probe assembly 24 removed/separated from calibration apparatus 70, this distance $LR_i$ is measured by means of CMM. When optical probe assembly 24 is mounted to calibration apparatus 70, the distance from the optically transparent material (e.g., pellicle 58 or glass plate 59) to calibration target 76 is measured as a value of $PR_i$. Non-coherent light interferometry can be utilized as disclosed in U.S. Pat. Nos. 5,757,485 (Marcus et al) and 5,757,486 (Marcus et al), commonly assigned and incorporated herein by reference, to determine the value of $PR_i$. Accordingly, with calibration reference surface 74 at a predetermined distance from probe mounting surface 60, the distance LP from the probe mounting surface 60 to pellicle 58 is obtained by the equation:

$$LP_i = LR_i - PR_i \quad \text{(Equation 7)}$$

wherein i=1 to n, wherein n is equal to the total number of optical fibers.

Note that $LP_i$ is equivalent to $P_{depth}$, as shown in FIG. 8. As such, optical probe calibration apparatus 70 is used in place of the value of $P_{depth}$ daily to verify/calibrate the position of pellicle 58 or glass plate 59. Accordingly, the value of $LP_i$ obtained from the calibration is then used as the value of $P_{depth}$ for the measurements made with optical probe assembly 24.

Figure 12:
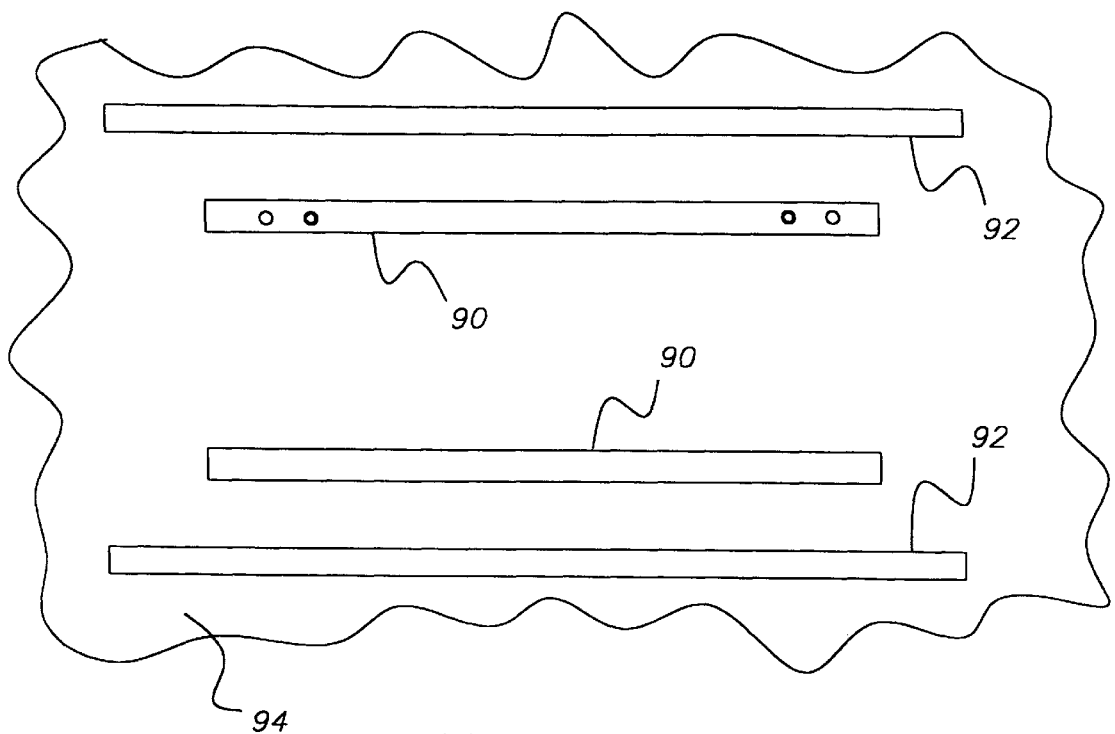
FIG. 12 shows inner and outer film rails disposed at a film rail plane.
Figure 14:
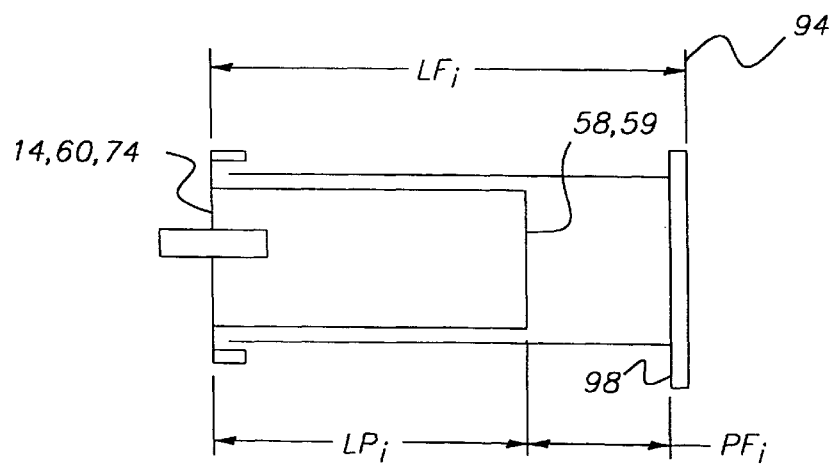
FIG. 14 shows a schematic view of a portion of the optical probe calibration apparatus in accordance with the method of the present invention.
Figure 13:
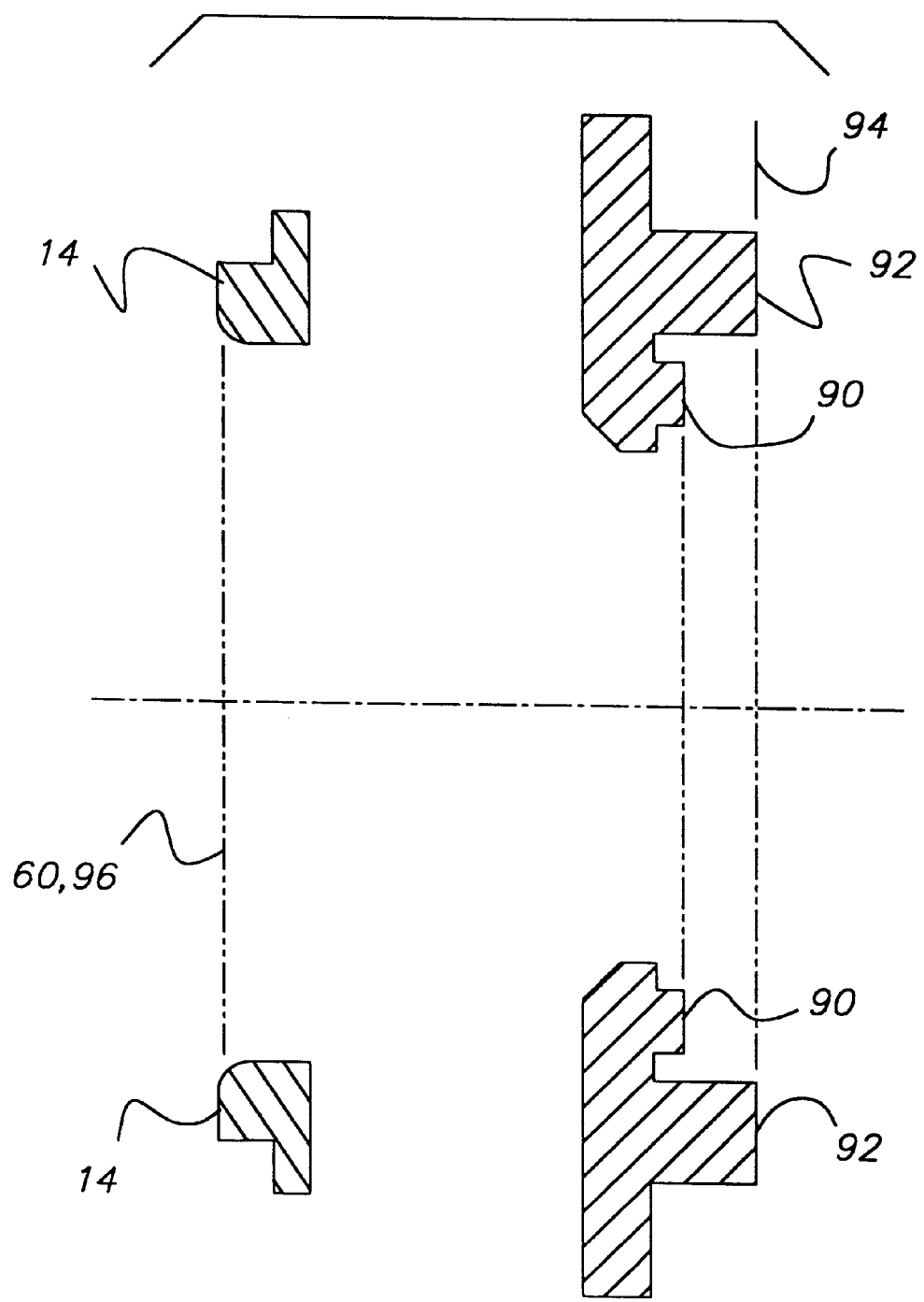
FIG. 13 shows a side view of the film rails of FIG. 12 disposed within an electronic or photographic camera.

In a photographic camera, it is known to advance photographic film using perforations disposed along the edges of the photographic film. Accordingly, within a photographic camera, there is disposed a guide member to maintain a length of photographic film within a plane (i.e., substantially planar). Such a guide member has generally been referred to as film rails, of which there is typically a pair. Further, some camera configurations include an inner pair of film rails 90 and an outer pair of film rails 92 disposed at a film rail plane 94, as illustrated in FIG. 12.

It may be advantageous to modify a body (i.e., housing) of an existing photographic camera body, which employs photographic film, for use as a body of an electronic camera, which employs an imager or image sensor. With such a modification, the film rails are typically used to facilitate the mounting of the imager or image sensor. For example, the imager or image sensor may be disposed on a mounting surface, which in turn, is mounted to the film rails by means of drilled and tapped holes in the film rails. Alternatively, the imager or image sensor can be glued to the film rails. Accordingly, a need arises for a method for measuring the physical distance between the plane of the film rails and a reference surface on the camera body so as to be able to properly mount the imager or image sensor within the camera body at an appropriate depth. In addition, a need arises for a method for verifying that the photographic camera is built within specifications. That is, a method is needed to verify that the location of the film rails is within specification. The present invention discloses such a method.

The method is described with reference to FIGS. 1–3 and 12–14. Camera body 15 includes lens mount 14 having a mounting surface 96. Mounting surface 96 is a first reference surface on camera body 15. An optically flat plate 98 is disposed at film rail plane 94 at either inner film rails 90 or outer film rails 92. An example of a suitable flat plate 98 is a 0.25 inch metal plate with a partially reflective surface. Accordingly, film rail plane 94 is a second reference surface on camera body 15. Flat plate 98 may be temporarily secured at the film rail plane by such mechanical means as screws, temporary clamping, or by a gravitationally arranged configuration (e.g., placing the flat plate on top of the film rails).

Optical probe assembly 24 is removably mounted to optical probe calibration apparatus 70 as described above. Also as described above, reference measurements on calibration reference surface 74 are obtained. The values are then subtracted from the appropriate CMM data to determine the value of distance $LP_i$ (i.e., the distance LP is the distance from the probe mounting surface 60 to pellicle 58 or glass plate 59), as described above with regard to Equation 7. Optical probe assembly 24 is then removably mounted to digital camera body 15, such that probe housing 42 is removably lockable to camera body 15 in a predetermined orientation, with probe mounting surface 60 at a predetermined distance from lens mount 14. In this configuration, non-coherent light interferometry is used to determine a distance $PF_i$ between optically transparent material 58,59 and flat plate 98. Accordingly, referring to FIG. 14, a distance $LF_i$ between the first reference plane (i.e., lens mount 14) and the second reference plane (i.e., film rail plane 94) is determined by the equation:

$$LP_i + PF_i = LF_i \quad \text{(Equation 8)}$$

Note that for testing a photographic camera, it is not necessary to permanently mount the metal plate to the camera. Rather, a support member is needed to temporarily hold flat plate 98 in position for measurement whereby the flat plate 98 is in intimate contact with the film rails.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 conventional camera body
12 lens 13 film
14 camera lens mount
15 digital camera body
16 image sensor; CCD
18 imager plane of image sensor
20 optically transparent plate; glass plate
21 non-coherent light interferometric measurement apparatus
22 interstice
23 locking means; spring loaded locking pin
24 optical probe assembly
25 unlocking means; spring loaded release pin
26 optical fiber cable
28 1×2 optical coupler
30 non-coherent light source
32 single mode fiber
34 optical fiber
36 non-coherent light interferometer
38 computing means; computer
42 probe housing
43 fiber strain relief
44 probe gripping portion
46 fiber receptacle
48 angled plate
50 mounting plate
51 probe mounting and locking member
52 opening
54 probe insertion portion
56 pellicle mounting portion
57 plastic snap ring
58 pellicle
59 glass plate
60 probe mounting surface
61 probe chuck
62 optical fiber
63 ferrule
64 GRIN lens
65 hole/opening
66 front surface
67 hole in probe chuck
68 back surface
69 opening
70 optical probe calibration apparatus
71 base, calibration apparatus
72 calibration mount
73 mounting plate
74 calibration reference surface
75 spacer member
76 calibration target
77 opening/hole
78 multiplexer
79 locking and mounting portion
80 electronics
81 recess
82 non-coherent light interferometer
84 cabling
86 computer
87 inner film rails
88 outer film rails
94 film rail plane
96 mounting surface
98 optically flat plate

What is claimed is:

1. A method for measuring a physical distance in a camera between a first reference surface on the camera and a second reference surface on the camera, the first reference surface being substantially parallel to the second reference surface, the method comprising the steps of:

determining a distance LP from the first reference surface to an optically transparent material disposed intermediate the first and second reference surface;

removably mounting an optical probe assembly to the camera, the optical probe assembly comprising a housing removably lockable to the camera in a predetermined orientation relative to the first reference surface;

mounting an optically flat plate at the second reference surface;

utilizing non-coherent light interferometry to determine a distance PF between the optically transparent material and the second reference surface; and determining a distance LF between the first reference surface and the second reference surface using the distances of LP and PF.

2. The method according to claim 1 wherein the distance LP from the first reference surface to the optically transparent material is determined by the steps of:

providing a calibration apparatus, the calibration apparatus including a calibration mount having an axis and a calibration mount reference surface on an exterior surface of the calibration mount;

mounting a calibration target substantially perpendicular to the calibration mount axis at a predetermined distance from the calibration mount reference surface;

determining a distance LR from the calibration target to the calibration mount reference surface;

removably mounting an optical probe assembly to the calibration apparatus, the optical probe assembly comprising a probe mounting surface, the optical probe assembly comprising the optically transparent material spaced from the probe mounting surface;

lockably securing the optical probe assembly to the calibration mount whereby the calibration mount reference surface is in a predetermined orientation relative to the probe mounting surface on the optical probe assembly, the probe mounting surface being at a predetermined distance from the first reference surface;

using non-coherent light interferometry to determine a distance PR from the optically transparent material to the calibration target; and calculating a distance LP from the probe mounting surface to the optically transparent material using the distances of LR and PR.

3. A method for measuring a physical distance in a camera between a lens flange mount and a film rail plane, the method comprising the steps of:

determining a distance LP from the lens flange mount to an optically transparent material disposed intermediate the lens flange mount and the film rail plane;

removably mounting a optical probe assembly in the camera, the optical probe assembly comprising a housing lockable to the camera in a predetermined orientation using a lens flange mounting ring;

mounting an optically flat plate at the film rail plane;

utilizing non-coherent light interferometry to determine a distance PF between the optically transparent material and the film rail plane; and determining a distance LF between the lens flange mount and the film rail plane using the distances of LP and PF.

4. The method according to claim 3 wherein the distance LP from the lens flange mount to the optically transparent material is determined by the steps of:

providing a calibration apparatus, the calibration apparatus including a calibration mount having an axis and a calibration mount reference surface on an exterior surface of the calibration mount;

mounting a calibration target substantially perpendicular to the calibration mount axis at a predetermined distance from the calibration mount reference surface;

determining a distance LR from the calibration target to the calibration mount reference surface;

removably mounting an optical probe assembly to the calibration apparatus, the optical probe assembly comprising a probe mounting surface, the optical probe assembly comprising the optically transparent material spaced from the probe mounting surface;

lockably securing the optical probe assembly to the calibration mount whereby the calibration mount reference surface is in a predetermined orientation relative to the probe mounting surface on the optical probe assembly, the probe mounting surface being at a predetermined distance from the lens flange mount;

using non-coherent light interferometry to determine a distance PR from the optically transparent material to the calibration target; and calculating a distance LP from the probe mounting surface to the optically transparent material using the distances of LR and PR.

* * * * *